(12) United States Patent
Hu et al.

(10) Patent No.: US 8,944,319 B2
(45) Date of Patent: *Feb. 3, 2015

(54) IC CARD

(71) Applicants: Chih-Kuei Hu, Jubei (TW); Wei-Ting Liu, Hacienda, CA (US); Wei-Hua Lu, Taipei (TW)

(72) Inventors: Chih-Kuei Hu, Jubei (TW); Wei-Ting Liu, Hacienda, CA (US); Wei-Hua Lu, Taipei (TW)

(*) Notice: Subject to any disclaimer, the term of this patent is extended or adjusted under 35 U.S.C. 154(b) by 0 days.

This patent is subject to a terminal disclaimer.

(21) Appl. No.: 13/733,230

(22) Filed: Jan. 3, 2013

(65) Prior Publication Data

US 2014/0015822 A1  Jan. 16, 2014

Related U.S. Application Data

(63) Continuation-in-part of application No. 12/693,458, filed on Jan. 26, 2010, now Pat. No. 8,365,989.

(51) Int. Cl.
*G06K 5/00* (2006.01)

(52) U.S. Cl.
USPC ............................ 235/380; 235/375; 235/382

(58) Field of Classification Search
USPC ................................ 235/380, 382, 382.5, 375
See application file for complete search history.

(56) References Cited

U.S. PATENT DOCUMENTS 8,365,989 B2 * 2/2013 Hu et al. .................... 235/380

* cited by examiner

*Primary Examiner* — Karl D Frech

(57) ABSTRACT

An IC card comprises a card body, a power-signal receiving unit, an electro-phoretic display, a driving circuit, a rechargeable battery and a power management unit. The driving circuit is electrically coupled to the power-signal receiving unit and the electro-phoretic display for receiving the updating information from the power-signal receiving unit and driving the electro-phoretic display according to the updating information. The power management unit is coupled to the rechargeable battery for managing charging process of the rechargeable battery.

13 Claims, 5 Drawing Sheets

ID CARD

CROSS REFERENCE TO RELATE APPLICATIONS

The present application is a Continuation-in-Part of U.S. patent application Ser. No. 12/693,458, entitled "IC Card", filed on Jan. 26, 2010.

BACKGROUND OF THE INVENTION

1. Field of the Invention

The present invention relates to an IC card, and more particularly, to an IC card having an electro-phoretic display for displaying information and an internal power source.

2. Description of the Prior Art

The IC card is popularly used in many purposes, such as credit card, computer security, financial, health care and personal identify. The characteristic of the IC card is that the card has a memory for storing personal information or security code. When the IC card is utilized in security purpose, the security machine will read the security code stored in the IC card to identify the user. When the IC card is utilized in banking purpose, the ATM machine will read the banking account information stored in the IC card.

The information stored in the conventional IC card can be only read by machine via the card reader, and users cannot recognize the information stored or updated in the IC card. It causes some inconvenience to the card holders.

SUMMARY OF THE INVENTION

It is therefore an objective of the present invention to provide an IC card having an electro-phoretic display for displaying information.

It is therefore a further objective of the present invention to provide an IC card having an internal power source to provide electric power to the electro-phoretic display and the operation of the IC card.

According to an objective of the present invention, an IC card is provided. The IC card comprises: a card body; a conductive pad for receiving a power and an updating information; an electro-phoretic display located on the card body for displaying an information; and a driving circuit, coupled to the conductive pad and the electro-phoretic display, for receiving the power and the updating information from the conductive pad and driving the electro-phoretic display according to the updating information.

According to another objective of the present invention, an IC card system is provided. The IC card system comprises: an IC card and a card reader. The IC card comprises: a card body; a conductive pad for receiving a power and an updating information; an electro-phoretic display located on the card body for displaying an information; and a driving circuit, electrically connected to the conductive pad and the electro-phoretic display, for receiving the power and the updating information from the conductive pad and driving the electro-phoretic display according to the updating information. The card reader comprises: a socket for allowing the IC card to plug in; a plurality of pins, for electrically connecting to the conductive pad when the IC card is being plugged in the socket; a power source, electrically connected to the pins, for providing the power to the IC card; and a controller, electrically connected to the pins, for providing the updating information to the IC card.

According to another objective of the present invention, a method for displaying an information on an IC card is provided. The IC card comprising a card body, a conductive pad, an electro-phoretic display located on the card body. The method comprises: providing a power to the IC card via the conductive pad; providing an updating information corresponding to the information to the IC card via the conductive pad; and driving the electro-phoretic display to display the information according to the updating information.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 1-1 is a diagram of an IC card according to the present invention.

DETAILED DESCRIPTION

Figure 1:
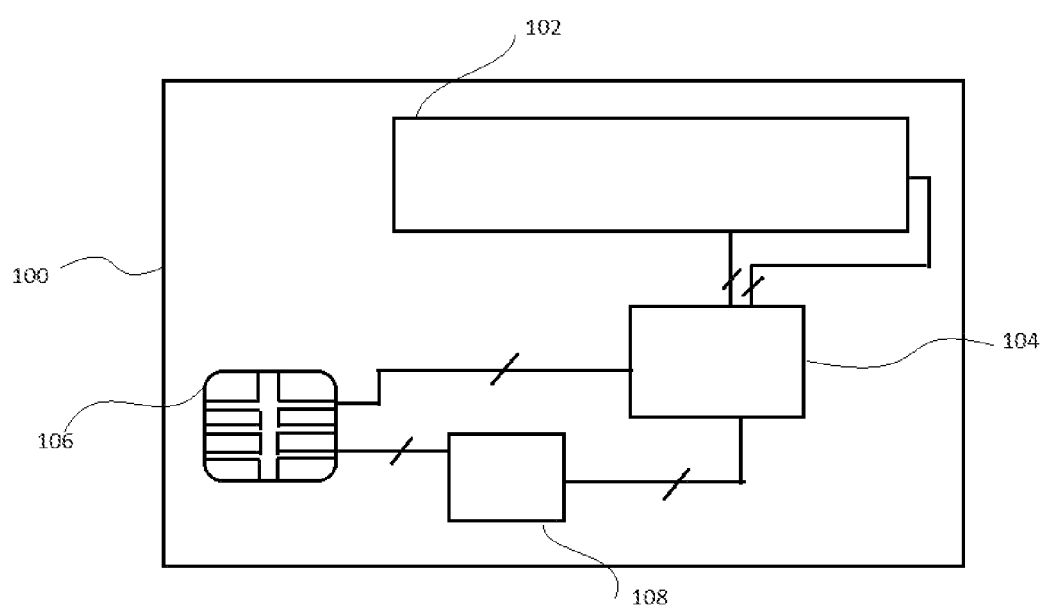
FIG. 1 is a diagram of an IC card according to the present invention.
Figure 1:
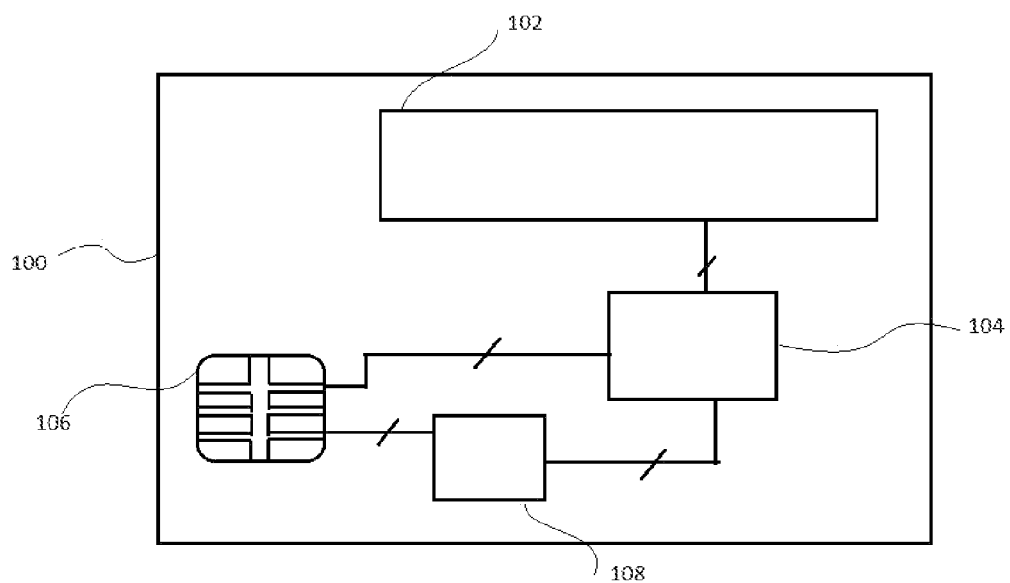

Please refer to FIG. 1, which shows an IC card according to the present invention. The IC card comprises a card body 100, an electro-phoretic display 102, a driving circuit 104, a conductive pad 106 and a rechargeable battery 108. The electro-phoretic display 102 is located on the card body 100 for displaying card information. The electro-phoretic display 102, or called electronic paper, is used for converting an electrical action into an optical action. The electro-phoretic display 102 comprises a layer of electro-phoretic material, a term which is used herein in its conventional meaning in the imaging art to refer to a material having first and second display states differing in at least one optical property, the material being changed from its first to its second display state by application of an electric field to the material.

The conductive pad 106 is used for receiving a power and an updating information. The rechargeable battery 108 is coupled to the conductive pad 106 for receiving the power. The rechargeable battery 106 is a thin film lithium battery, a thin film lithium ion battery, a printed battery or other batteries capable of integrating into an IC card. The driving circuit 104 is coupled to the conductive pad 106, the rechargeable battery 108 and the electro-phoretic display 102, and the driving circuit 104 receives the power from the rechargeable battery 108 and the updating information from the conductive pad 106 and drives the electro-phoretic display 102 according to the updating information. The driving circuit 104 comprises a select driver and a data driver for driving the electro-phoretic display 102, and the select driver and the data driver can drive the electro-phoretic display 102 via a plurality of data lines and a plurality of select lines to define the pixels of the electro-phoretic display 102. If the electro-phoretic display 102 is not a dot matrix display but a graphic icon display, please refer to FIG. 1-1, the driving circuit 104 comprises a segment driver for driving a plurality of graphic icons on the electro-phoretic display 102. The driving circuit 104 can further comprise a memory for storing the card information. Certainly, the memory can be also separated from the driving circuit 104 according to the chip design.

The conductive pad of the IC card comprises several contacts. When inserted the IC card into a card reader, the pins of the card reader can electrically connect the contacts of the IC card to read information from the memory and write information back. In the general condition, the conductive pad should meet the ISO/IEC 7810 and ISO/IEC 7816 standards. The standards define the pad shape, position and functionality of the contacts. According to the standards, the conductive pad comprises eight contacts, and in which, two contacts are reserved with no function. In the present invention, the conductive pad comprises a power contact for receiving the power, and a signal contact for receiving the updating information. The power contact defined in the ISO/IEC standards can be utilized as the power contact of the present invention, and the reserved contacts defined in the ISO/IEC standards can be utilized as the signal contact of the present invention. Therefore, the present invention can meet the ISO/IEC definition, and can be popularly used. Certainly, the contact definition according to the ISO/IEC standards is one embodiment of the present invention, and the amount, position and functionality of the contacts can be also arranged as user defined. For example, the signal contact can be utilized to transfer the personal information or the security code as convention, and the reserved contact can be utilized to transfer the updating information. In another design, the signal contact can be utilized to transfer both the personal information or the security code and the updating information with serial transmission or time division method. For example, the personal information or the security code stored in the memory can be read out via the signal contact, and then the updating information can be written to the memory or the driving circuit via the same signal contact.

Figure 2:
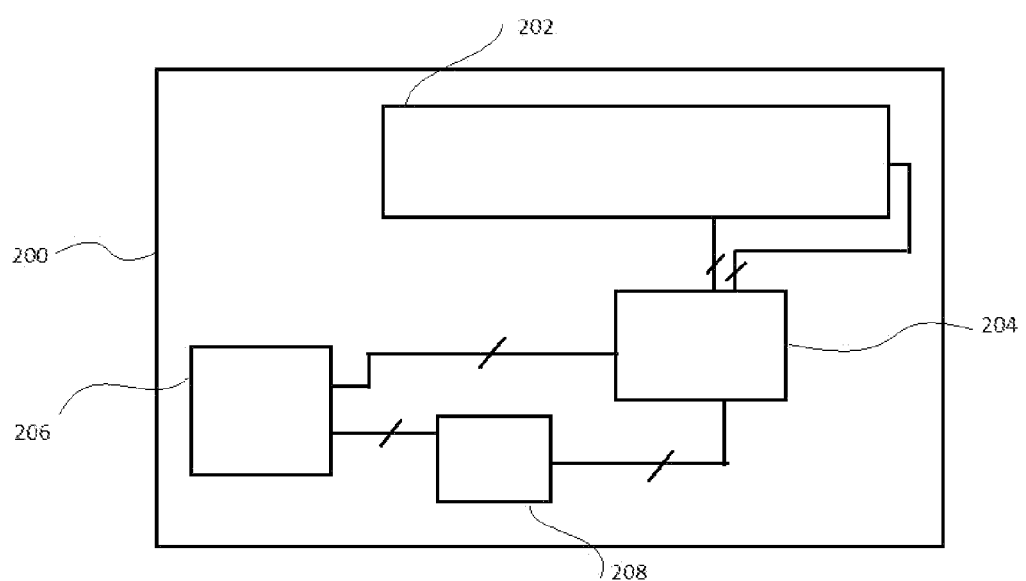
FIG. 2 is a diagram of an IC card according to the present invention.

Please refer to FIG. 2, which shows another IC card according to the present invention. The IC card in FIG. 2 is a contactless type IC card which comprises a card body 200, an electro-phoretic display 202, a driving circuit 204, a wireless receiving circuit 206 and a rechargeable battery 208. The wireless receiving circuit 206 is used for receiving an updating information and a charging energy source, and transforming the charging energy source into electric power for the rechargeable battery 208. The charging energy source is electromagnetic, radio frequency, micro wave, or solar energy. The rechargeable battery 208 is coupled to the wireless receiving circuit 206 for receiving the power. The rechargeable battery 208 is a thin film lithium battery, thin film lithium ion battery, printed battery or other batteries capable of integrating into an IC card. The driving circuit 204 is coupled to the wireless receiving circuit 206, the rechargeable battery 208 and the electro-phoretic display 202, and the driving circuit 204 receives the power from the rechargeable battery 208 and the updating information from the wireless receiving circuit 206 and drives the electro-phoretic display 202 according to the updating information. The driving circuit 204 comprises a select driver and a data driver for driving the electro-phoretic display 202, and the select driver and the data driver can drive the electro-phoretic display 202 via a plurality of data lines and a plurality of select lines to define the pixels of the electro-phoretic display 202. The driving circuit 204 can further comprise a memory for storing the card information. Certainly, the memory can be also separated from the driving circuit 204 according to the chip design.

Figure 3:
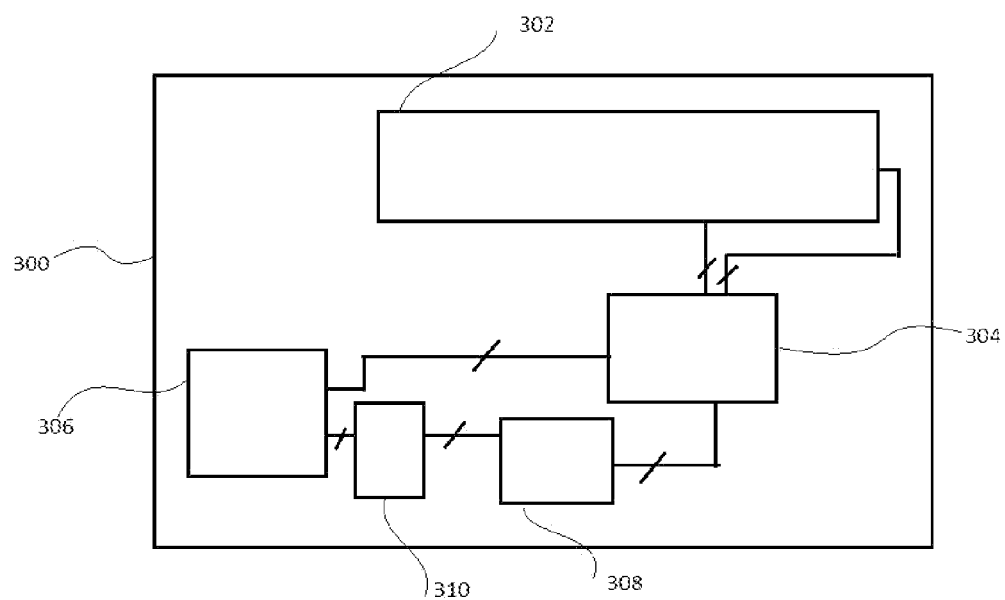
FIG. 3 is a diagram of an IC card according to the present invention.

Please refer to FIG. 3, which shows a further embodiment of the present invention. The IC card in FIG. 3 comprises a card body 300, an electro-phoretic display 302, a driving circuit 304, a power-signal receiving unit 306, a rechargeable battery 308 and a power management unit 310. The power-signal receiving unit 306 is a contact or contactless type power-signal interface, such as the contact type interface illustrated in FIG. 1 or the wireless type interface illustrated in FIG. 2. The power-signal receiving unit 306 is used for receiving an updating information and at least one power source. The power-signal receiving unit 306 can receive multiple power sources simultaneously, and furthermore the power-signal receiving unit 306 can have both contact and contactless type interface integrated together in the IC card. The rechargeable battery 308 is a thin film lithium battery, thin film lithium ion battery, printed battery or other batteries capable of integrating into an IC card.

The power management unit 310 is used for receiving electric power from the power-signal receiving unit 306, determining the type of power source, and choosing the power source according to pre-defined criteria. For example, when the power-signal receiving unit 306 receives a radio frequency power energy from the contactless type interface and a DC power energy from the contact type interface simultaneously, the power management unit 310 can determine the type of power source and then choose the DC power energy to charge the rechargeable battery 308. The criteria are defined in advance according to charging efficiency, intensity of power energy, updating information, battery status or others. For example, power energy from the contact type interface can have a priority comparing to power energy from the contactless type interface. For another example, when the power-signal receiving unit 306 receives an updating information during the charging process, the power management unit 310 can determine displaying the information immediately or after a certain delay time according to the battery recharging status. The rechargeable battery 308 is coupled to the power management unit 310 for receiving the power. The rechargeable battery 308 is a thin film lithium battery, thin film lithium ion battery, printed battery or other batteries capable of integrating into an IC card. The driving circuit 304 is coupled to the power-signal receiving unit 306, the rechargeable battery 308 and the electro-phoretic display 302, and the driving circuit 304 receives the power from the rechargeable battery 308 and the updating information from the power-signal receiving unit 306 and drives the electro-phoretic display 302 according to the updating information.

The IC card of the present invention can be connected to a card reader via the contact or contactless type interface to receive the updating information. The updating information can be commercial information, such as sales promotion. The updating information can be also a personalized information, such as membership status or health care information. The updating information is provided to the IC card from a host, and then written into the IC card via the card reader. The driving circuit receives the updating information from the card reader and the contact or contactless type interface, and then updates the electro-phoretic display according to the updating information.

Figure 4:
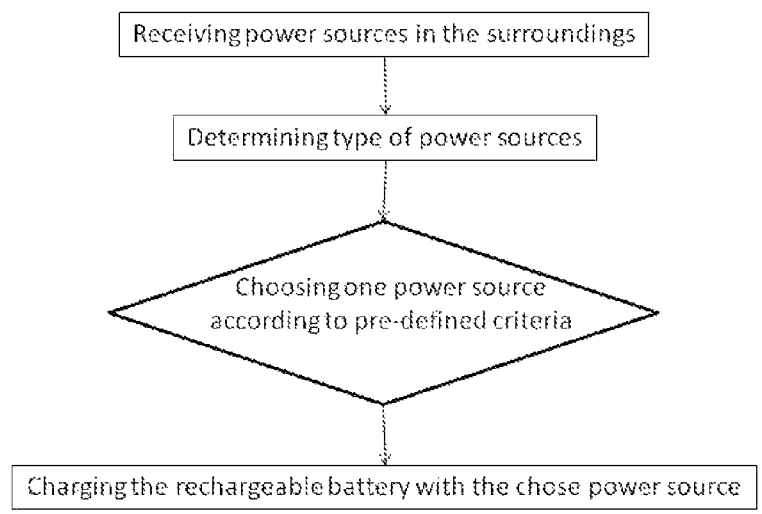
FIG. 4 is a flow chart of a method for managing the charging process of the rechargeable battery according to the present invention.

Please refer to FIG. 4, which shows a flow chart of the method for managing the charging process of the rechargeable battery in the IC card. The power-signal receiving unit receives several power sources in the surroundings and an updating information. The power management unit is coupled to the power-signal receiving unit, and the power management unit can determine types of the power sources and choose one power source to charge the battery. For example, when the power-signal receiving unit receives a radio frequency power energy from the contactless type interface and a DC power energy from the contact type interface simultaneously, the power management unit can determine the type of power source and then choose the DC power energy to charge the rechargeable battery. The criteria are defined in advance according to charging efficiency, intensity of power energy, updating information, battery status or others. For example, power energy from the contact type interface can have a priority comparing to power energy from the contactless type interface.

Furthermore, in another embodiment, when the power-signal receiving unit receives an updating information during the charging process, the power management unit can determine displaying the information immediately or after a certain delay time according to the battery recharging status. For example, the power stored inside the rechargeable battery (the power remain of the rechargeable battery) may be low, and is not enough for driving the display 202. In this case, the power management unit determines to charge the battery 308 first instead of displaying information. After a certain delay time, the rechargeable battery 308 can be charged enough power and the power management unit allows to display the information on the display by using power of the battery 308. On the other hand, if the power management unit detects that the battery 308 contains enough power, the power management unit can determine to display the information immediately, and the charging process and the display process are performed at the same time.

In this embodiment, the rechargeable battery is coupled to the power management unit for receiving the power. The rechargeable battery is a thin film lithium battery, thin film lithium ion battery, printed battery or other batteries capable of integrating into an IC card. The driving circuit is coupled to the power-signal receiving unit, the rechargeable battery and the electro-phoretic display, and the driving circuit receives the power from the rechargeable battery and the updating information from the power-signal receiving unit and drives the electro-phoretic display according to the updating information.

Those skilled in the art will readily observe that numerous modifications and alterations of the device and method may be made while retaining the teachings of the invention.

What is claimed is:

1. An IC card comprising:
   a card body;
   a power-signal receiving unit for receiving a power and an updating information;
   an electro-phoretic display locating in the card body for displaying an information;
   a driving circuit, electrically coupled to the power-signal receiving unit and the electro-phoretic display, for receiving the updating information from the power-signal receiving unit and driving the electro-phoretic display according to the updating information;
   a rechargeable battery, electrically coupled to the power-signal receiving unit and the driving circuit for receiving the power from the power-signal receiving unit and providing the power to the driving circuit; and
   a power management unit, electrically coupled to the rechargeable battery, for managing a charging process of the rechargeable battery.

2. The IC card of claim 1 wherein the power-signal receiving unit comprises a contact type interface for receiving the power through a contact pad.

3. The IC card of claim 2 wherein the power-signal receiving unit further comprises a contactless type interface for receiving the power through a way of electromagnetic, radio frequency, micro wave or solar energy.

4. The IC card of claim 3, wherein the power management unit determines to charge the rechargeable battery through the contact type interface when the contact type interface and the contactless type interface are both available to receive the power.

5. The IC card of claim 1 wherein the power-signal receiving unit further comprise a contactless type interface for receiving the power through a way of electromagnetic, radio frequency, micro wave or solar energy.

6. The IC card of claim 1 wherein the power-signal receiving unit receives the power through more than one power sources.

7. The IC card of claim 6 wherein the power management unit chooses one of the power sources to charge the rechargeable battery according to a pre-defined criterion.

8. The IC card of claim 1, wherein the power management unit manages the charging process according to a power remain of the rechargeable battery.

9. The IC card of claim 8, wherein the power management unit detects whether the power remain of the rechargeable battery is enough to drive the electro-phoretic display.

10. The IC card of claim 9, wherein if the power remain is enough, the power management unit determines to drive the electro-phoretic display immediately.

11. The IC card of claim 9, wherein if the power remain is not enough, the power management unit determines to charge rechargeable battery firstly, and allows to drive electro-phoretic display after a certain delay time.

12. A method for managing a charging process of a rechargeable battery in a IC card comprising:
    receiving at least one power source through a power-signal receiving unit;
    determining types of the power source;
    choosing one power source according to a pre-defined criterion; and
    charging the rechargeable battery with the chosen power source.

13. The method of claim 12, wherein the types of the power sources comprise a contact type power source and a contactless type power source, and the step of choosing one power source comprises:
    choosing the contact type power source instead of the contactless type power source.

* * * * *